(No Model.) 4 Sheets—Sheet 1.
W. GODFREY & G. W. HALSTEAD.
MACHINE FOR FORMING VENEER DRUMS.
No. 369,638. Patented Sept. 6, 1887.
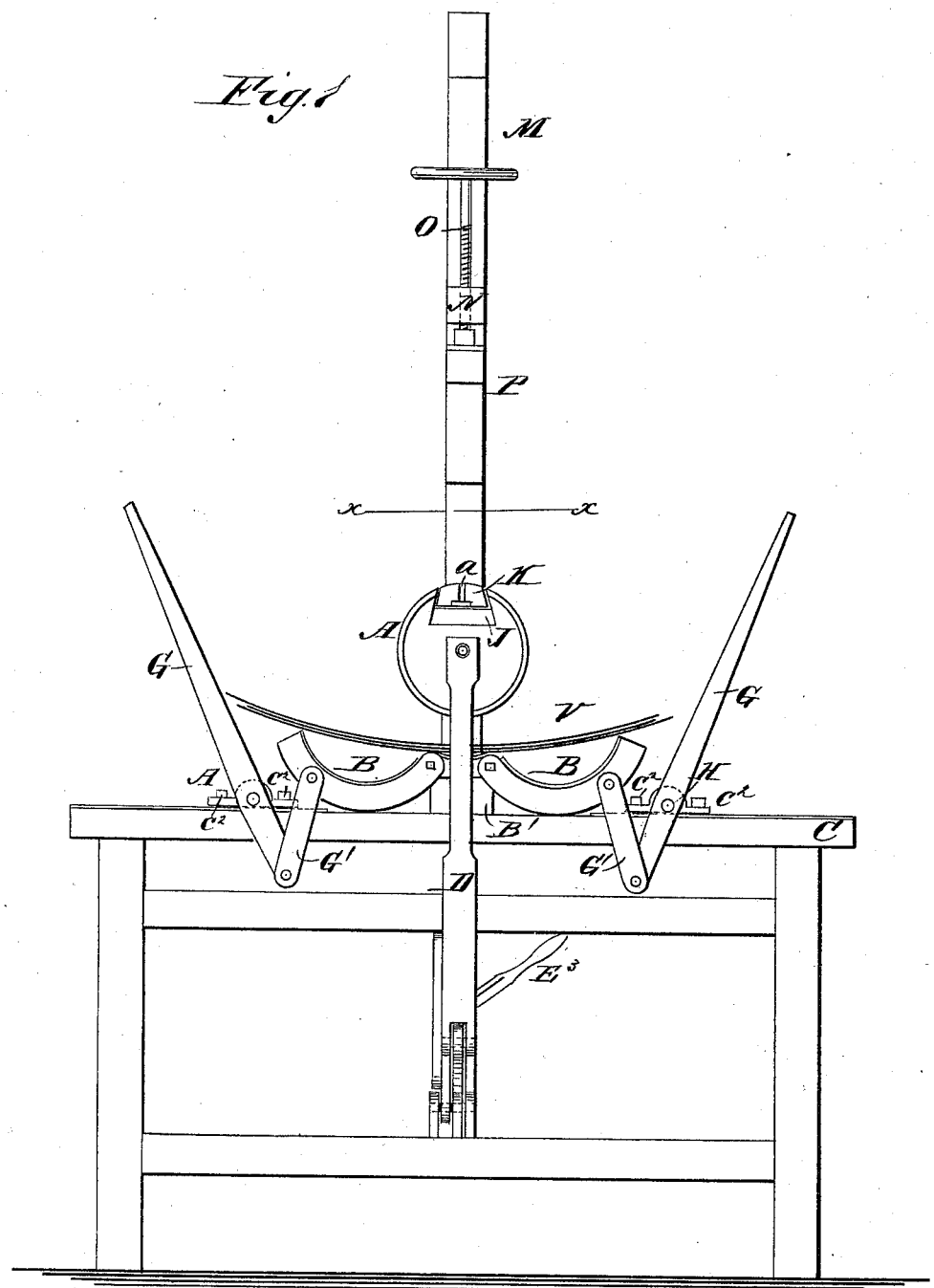
WITNESSES:
Francis McArdle.
C. Sedgwick
INVENTOR:
W. Godfrey
G. W. Halstead
BY Munn & Co.
ATTORNEYS.

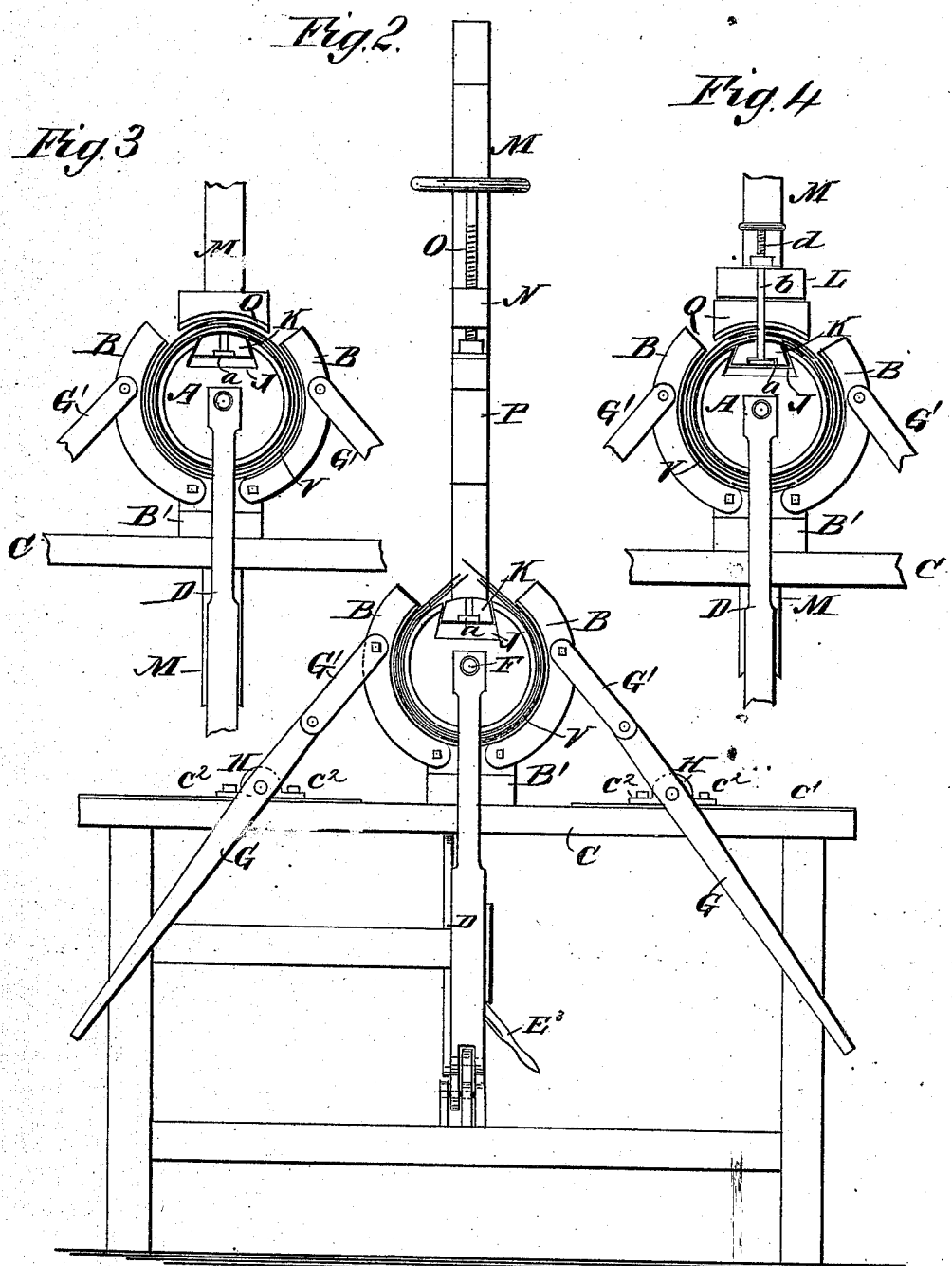

(No Model.) 4 Sheets—Sheet 3.
W. GODFREY & G. W. HALSTEAD.
MACHINE FOR FORMING VENEER DRUMS.
No. 369,638. Patented Sept. 6, 1887.
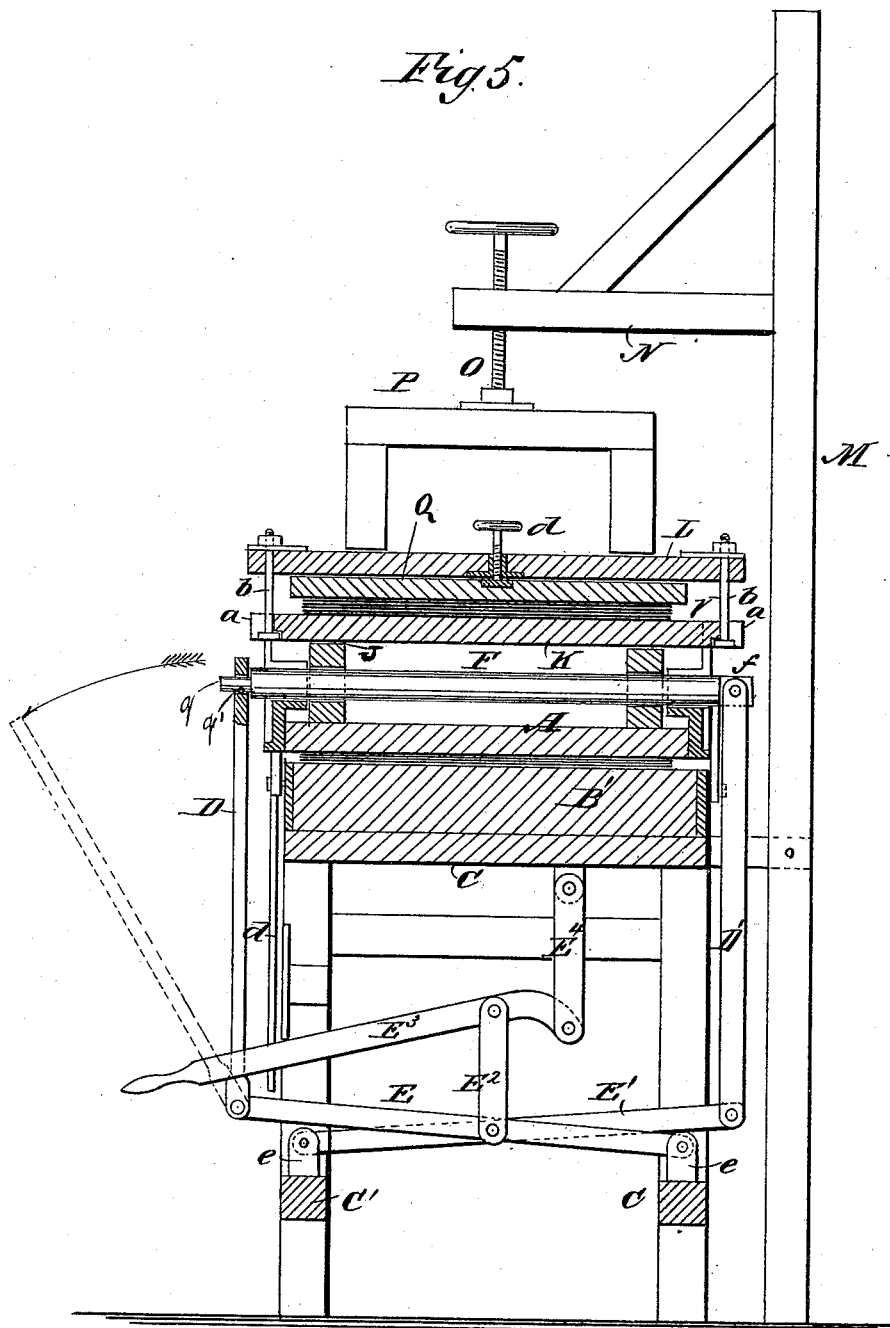
WITNESSES:
Francis McArdle.
C. Sedgwick
INVENTOR:
W. Godfrey
G. W. Halstead
BY Munn & Co.
ATTORNEYS.

(No Model.) 4 Sheets—Sheet 4.

W. GODFREY & G. W. HALSTEAD.
MACHINE FOR FORMING VENEER DRUMS.

No. 369,638. Patented Sept. 6, 1887.

WITNESSES:
Francis McArdle
C. Sedgwick

INVENTOR:
W. Godfrey
G. W. Halstead
BY Munn & Co
ATTORNEYS.

UNITED STATES PATENT OFFICE.

WILSON GODFREY AND GEORGE W. HALSTEAD, OF BROOKLYN, NEW YORK; SAID HALSTEAD ASSIGNOR TO SAID GODFREY.

MACHINE FOR FORMING VENEER DRUMS.

SPECIFICATION forming part of Letters Patent No. 369,638, dated September 6, 1887.

Application filed September 16, 1886. Serial No. 213,655. (No model.)

*To all whom it may concern:*

Be it known that we, WILSON GODFREY and GEORGE W. HALSTEAD, of Brooklyn, in the county of Kings and State of New York, have invented a new and Improved Machine for Forming Veneer Drums, of which the following is a full, clear, and exact description.

Our invention relates to a machine or apparatus for forming veneer drums, to be subsequently headed and hooped to form packages for dry groceries, &c.; and the invention consists, principally, of the combination, with a forming-cylinder, of two curved jaws adapted to fold the veneer around the forming-cylinder.

The invention also consists of means for lifting the forming-cylinder to enable the veneer to be placed beneath it upon the jaws; also, in forming the forming-cylinder with a recess combined with special clamping mechanism for binding the lapped edges of the veneer so that the drum may be removed from the forming-cylinder.

The invention also consists of the means for operating the jaws and of the means for holding the cylinder whereby the drum may be removed from the same; and, finally, the invention consists of the construction, arrangement, and combination of parts, all as hereinafter described and claimed.

Reference is to be had to the accompanying drawings, forming a part of this specification, in which similar letters of reference indicate corresponding parts in all the figures.

Figure 6:
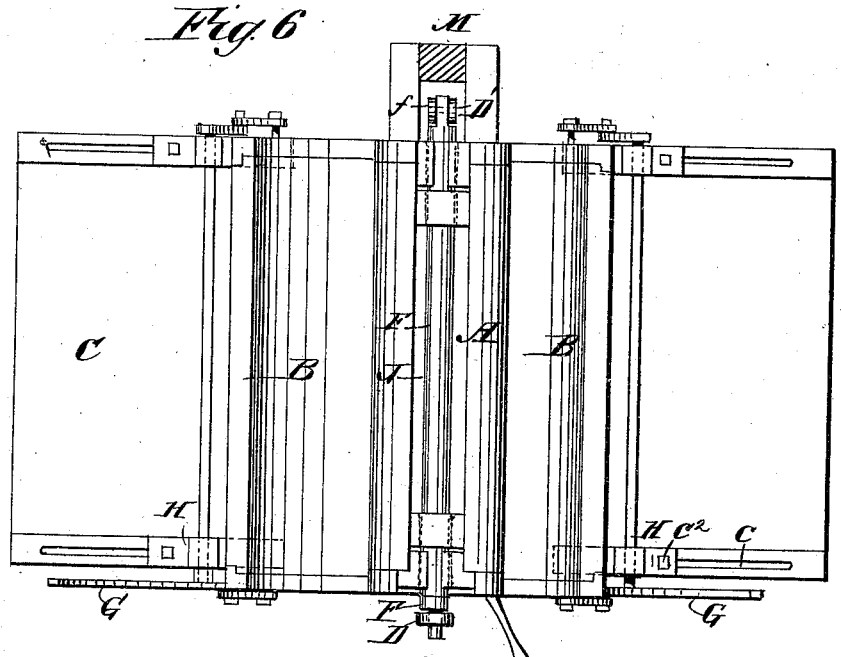
Figure 7:
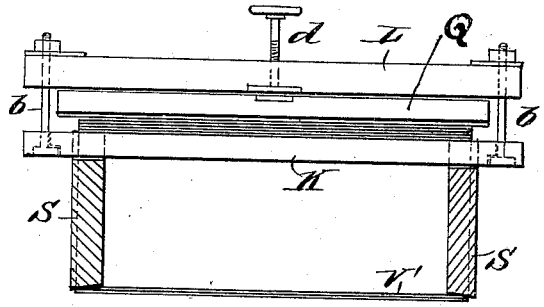
Figure 8:
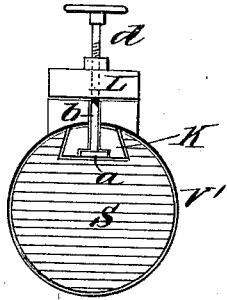

Figure 1 is an end elevation of the apparatus or machine, showing sheets of veneer placed upon the jaws ready to be closed upon or around the forming-cylinder. Fig. 2 is a similar view showing the jaws closed and the sheets of veneer bent around the forming-cylinder. Fig. 3 is a similar detail view showing the first upper clamping-bar placed upon the lapped ends of the veneer. Fig. 4 is a similar view showing the application of the whole clamping device. Fig. 5 is a transverse sectional elevation of the apparatus, showing the jaws closed, the veneer bent around the forming-cylinder, and showing the clamping device applied to the lapped edges of the veneer. Fig. 6 is a sectional plan view of the machine with the jaws open, the section being taken on the line $xx$ of Fig. 1. Fig. 7 is a sectional view of the drum and clamping device removed from the forming-cylinder and provided with temporary heads for keeping the drum perfectly circular while drying. Fig. 8 is an end elevation of the same; and Fig. 9 is a detail sectional view of a part of the table, showing the adjustable fulcrum of the levers for operating the jaws.

A represents the forming-cylinder, and B the concaved jaws for closing or bending the veneer V upon and around the forming-cylinder. The jaws B B are hinged at their lower edges to the block B', secured upon the table C, while the forming-cylinder is held immediately over the said block B' by the vertical side bars, D D', which rise, respectively, from the outer ends of the two levers E E', beneath the table C. The opposite ends of the levers E E' are fulcrumed to the lugs $e\ e$, secured upon the cross-pieces C' C' of the frame that supports the table C, and these levers are connected in the center by the link $E^2$ to the lever $E^3$, fulcrumed by the link $E^4$, that depends from the bottom of the table C. The levers E E' are crossed, as shown in Fig. 5, so that by lifting the lever $E^3$ the forming-cylinder A may be raised to the position shown in Fig. 1, to receive the veneer V beneath it and then lowered upon the veneer, to hold it upon the block B', ready to be closed upon the cylinder by the jaws B B. The gudgeon or shaft F of the forming-cylinder is hinged to the side piece, D', and the latter is hinged to the lever E', while the side piece, D, is hinged to the lever E and simply placed upon a pintle, $q$, formed at the end of the shaft F and held thereto by a pin, $q'$, or key, so that by removing this pin or key the side piece, D, may be detached from the forming-cylinder and swung outward to the position shown in dotted lines, Fig. 5, to permit the drum V', Figs. 7 and 8, when formed and clamped to be drawn endwise off from the forming-cylinder. The hinge $f$ of the shaft F and side piece, D', permits the forming-cylinder to be lifted at the opposite end to facilitate the removal of the drum and clamping devices.

The jaws B B are operated by the levers G

G, fulcrumed upon adjustable blocks H attached to the table C and connected to the jaws by links G', which have a toggle action, so that when the levers are turned to the position shown in Fig. 1 the jaws will be opened or turned back, and when the levers are brought downward to the position shown in Fig. 2 the jaws will be closed with great force against the forming-cylinder, bending the veneer around the cylinder, as shown in Figs. 2, 3, and 4.

In the cylinder A is formed the longitudinal dovetail recess J, to receive the lower clamping-bar, K, which fits said recess and may be shoved endwise therein. The ends of the bar K are formed with slotted recesses $a$, to receive and hold the headed bolts $b\, b$, which pass through the upper clamping-bar, L, and this upper bar, too, is provided with a central screw, $d$, for effecting the final or second clamping, the said screw acting upon the pressure-bar Q, and for holding of the ends of the veneer while drying, as hereinafter described.

Near the table C is placed the strong upright M, which is provided above the forming-cylinder A with the horizontal arm N, which carries the screw-threaded shaft O, to the lower end of which is swiveled the frame P, which may be raised and lowered by turning the screw-shaft O to effect the first clamping of the ends of the veneer.

In forming a veneer drum the lever $E^3$ is first lifted and the levers G turned to the position shown in Fig. 1. This will put the parts in the position shown in Fig. 1, so that the sheets of veneer V may be placed beneath the forming-cylinder A upon the jaws B and block B'. The veneer being so placed in the machine, the lever $E^3$ is forced downward, which movement will bring the forming-cylinder down upon the veneer. This time the levers G are to be turned to the position shown in Fig. 2, which will close the jaws and bend the sheets of veneer upon and around the forming-cylinder. The lower clamping-bar, K, (if not previously in place,) may now be shoved into the recess J. The ends of the sheets of veneer are then properly adjusted upon each other, and to hold them a curved intermediate clamping-block, Q, is placed upon the lapped edges, as shown in Fig. 3. This done, the upper clamping-bar, L, is put in place upon the intermediate bar, Q, and the bolts $b$ placed in the slots $a$ of the lower clamping-bar, K, thus locking the clamping-bars K L Q together upon the lapped edges of the veneer. The screw O is then screwed down to bring the frame P down upon the clamping-bar L, thus effecting the first compression of the lapped edges of the veneer. The nuts upon the rods $b\, b$ will then be screwed down as far as possible and the screw $d$ turned down, which effects the second compression and binds the clamping-bars to the veneer. The screw O is then turned upward, the side bar, D, disconnected from the shaft F and swung outward, as shown in dotted lines in Fig. 5, and then the drum and clamping-bars are drawn out of and off from the forming-cylinder A. This done, temporary heads S S are fitted in the ends of the drum, as shown in Figs. 7 and 8, to keep the drum perfectly cylindrical while drying.

The fulcrums H H of the levers G are attached to the table C in grooves $c$ by means of plates $c'$ and headed bolts $c^2$, so that by loosening the screws the said fulcrums may be moved to and from the forming-cylinder A to suit the levers to the thickness of the veneer or to the number of sheets used in forming the drum, so that no matter how thick the veneer, or of how many plies the drum may be made, the fulcrums of the levers G may always be set to cause the jaws B B to effect a perfect and close bending of the veneer around the forming-cylinder A.

We lay no claim in this application to the forming-cylinder A, formed with the recess J, with the bar K, and the outer bars, L Q, bolts $b$, and screw $d$, as such matter is shown in our patent, No. 360,344, dated March 29, 1887.

Having thus fully described our invention, what we claim as new, and desire to secure by Letters Patent, is—

1. The side pieces, D D', the forming-cylinder held therein, and the fixed block B', and hinged concaved jaws B B, in combination with means, substantially as described, for lifting the said side pieces, D D', and the forming-cylinder, as and for the purposes set forth.

2. The concaved jaws B B, pivoted to the block B', and the forming-cylinder, in combination with the levers G, links G', and the adjustable fulcrums H for the levers G, substantially as described.

3. The side pieces, D D', and the forming-cylinder held therein, in combination with the levers E E', link $E^2$, lever $E^3$, and support $E^4$, substantially as described.

4. The combination, with the forming-cylinder, recessed at J, and the concaved jaws B B, of the lower clamping-bar, K, held in the recess J, the upper clamping-bar, L, intermediate bar, Q, rods $b\, b$, screw $d$, arm N, screw O, and frame P, substantially as described.

WILSON GODFREY.
GEO. W. HALSTEAD.

Witnesses:
E. S. CANDLER,
CHARLES DE GAUGUE.